(12) United States Patent
Ahmed

(10) Patent No.: US 8,155,237 B2
(45) Date of Patent: Apr. 10, 2012

(54) MULTI-CARRIER TRANSMITTER

(75) Inventor: Walid Khairy Mohamed Ahmed, Tinton Falls, NJ (US)

(73) Assignee: Pine Valley Investments, Inc., Las Vegas, NV (US)

( * ) Notice: Subject to any disclaimer, the term of this patent is extended or adjusted under 35 U.S.C. 154(b) by 681 days.

(21) Appl. No.: 12/027,713

(22) Filed: Feb. 7, 2008

(65) Prior Publication Data
US 2009/0202006 A1  Aug. 13, 2009

(51) Int. Cl.
*H04L 27/00* (2006.01)

(52) U.S. Cl. ........ 375/295; 375/261; 375/296; 375/297; 333/149; 455/108

(58) Field of Classification Search .................. None
See application file for complete search history.

(56) References Cited

U.S. PATENT DOCUMENTS

| | | |
|---|---|---|
| 4,534,040 A | 8/1985 | Thapar |
| 4,580,111 A | 4/1986 | Swanson |
| 4,804,931 A | 2/1989 | Hulick |
| 4,947,455 A | 8/1990 | Swanson |
| 4,952,890 A | 8/1990 | Swanson |
| 5,268,658 A | 12/1993 | Edwards |
| 5,367,272 A | 11/1994 | Hulick |
| 5,392,007 A | 2/1995 | Cripe |
| 5,450,044 A | 9/1995 | Hulick |
| 5,469,127 A | 11/1995 | Hulick et al. |
| 5,598,436 A * | 1/1997 | Brajal et al. .................. 375/297 |
| 5,621,351 A | 4/1997 | Puri et al. |
| 5,867,071 A | 2/1999 | Chethik |
| 5,886,573 A | 3/1999 | Kolanek |
| 5,949,796 A * | 9/1999 | Kumar .......................... 370/529 |
| 6,041,082 A | 3/2000 | Takeda et al. |
| 6,130,910 A | 10/2000 | Anderson et al. |
| 6,147,553 A * | 11/2000 | Kolanek ........................ 330/10 |
| 6,255,906 B1 | 7/2001 | Eidson et al. |
| 6,377,784 B2 | 4/2002 | McCune |
| 6,411,655 B1 | 6/2002 | Holden et al. |
| 6,636,112 B1 | 10/2003 | McCune |
| 6,658,238 B1 | 12/2003 | Ursenbach et al. |
| 6,738,432 B2 | 5/2004 | Pehlke et al. |
| 6,791,417 B2 | 9/2004 | Pengelly et al. |
| 6,799,020 B1 | 9/2004 | Heidmann et al. |
| 6,816,008 B2 | 11/2004 | Kontson |
| 2005/0030104 A1 | 2/2005 | Chen et al. |
| 2008/0013639 A1 * | 1/2008 | Rick et al. ...................... 375/260 |

* cited by examiner

*Primary Examiner* — David C. Payne
*Assistant Examiner* — Adolf Dsouza
(74) *Attorney, Agent, or Firm* — Allen, Dyer, Doppelt, Milbrath & Gilchrist, P.A.

(57) ABSTRACT

A multi-carrier transmitter and methods thereof are provided. For example, a multi-carrier transmitter comprises a processor operable to receive a plurality of baseband signals. Each of the plurality of baseband signals correspond to a separate data communication. A modulator is in communication with the processor. A non-linear device is in communication with the modulator. The processor is further operable to combine the plurality of baseband signals to generate a composite baseband signal. The modulator is operable to modulate a carrier signal with the composite baseband signal to generate a multi-carrier signal. The multi-carrier signal is provided to an input of the non-linear device.

17 Claims, 4 Drawing Sheets

MULTI-CARRIER TRANSMITTER

TECHNICAL FIELD

The embodiments may relate to data communication, specifically to transmitters and generation of transmission signals.

BACKGROUND

Data communication in modern society is an essential fact of life. The use of computers, cellular ("cell") phones, and personal digital assistants ("PDAs") is a daily occurrence for many people. As a result, there is an increasing demand for faster, cheaper, and/or more convenient data communications.

The wireless communications industry attempts to satisfy users by developing hardware and/or software to perform more complex data communications for faster or better results. For example, cell phone and base station developers and/or manufacturers are implementing multi-carrier transmission techniques. Multi-carrier transmission schemes are an evolving phenomena.

Multi-carrier transmissions support multiple users at the same time by spreading data over a wider bandwidth. The data may be spread to improve transmission quality. For example, signal-to-noise and interference ratios may be reduced by spreading data over a wider bandwidth than the data rate.

However, current systems for multi-carrier transmissions inefficiently utilize redundant components, which increases costs and/or power consumption. For example, a multi-carrier transmitter may include redundant voltage controlled oscillators ("VCOs") or IQ mixers to perform baseband to radio frequency ("RF") up-conversions. Also, redundant RF filters may be used to suppress noise and/or spurs.

BRIEF SUMMARY

According to a first aspect, a multi-carrier transmitter comprises a processor operable to receive a plurality of baseband signals. Each of the plurality of baseband signals correspond to a separate data communication. A modulator is in communication with the processor. A non-linear device is in communication with the modulator. The processor is further operable to combine the plurality of baseband signals to generate a composite baseband signal. The modulator is operable to modulate a carrier signal with the composite baseband signal to generate a multi-carrier signal. The multi-carrier signal is provided to an input of the non-linear device.

According to a second aspect, a multi-carrier transmitter comprises a processor operable to receive a plurality of baseband signals. Each of the plurality of baseband signals correspond to a respective radio frequency ("RF") sub-signal of a plurality of RF sub-signals. A pre-amplifier stage is in communication with the processor. A power amplifier is in communication with the pre-amplifier stage. The processor is further operable to combine the plurality of baseband signals to generate a composite baseband signal. The pre-amplifier stage is operable to modulate a RF carrier signal as a function of the composite baseband signal to generate a multi-carrier signal. The multi-carrier signal includes the plurality of RF sub-signals. The power amplifier is operable to amplify the multi-carrier signal and output an amplified multi-carrier signal.

According to a third aspect, a method for generating a multi-carrier signal is provided. For example, a plurality of baseband signals are received. Each of the plurality of baseband signals correspond to a separate data communication. The plurality of baseband signals are combined to generate a composite baseband signal. A carrier signal is modulated with the composite baseband signal to generate a multi-carrier signal. The carrier signal has a center frequency. The multi-carrier signal comprises a plurality of sub-signals corresponding to the plurality of baseband signals, respectively. Each of the plurality of sub-signals are spaced at different frequencies from the center frequency.

Other systems, methods, features and advantages of the invention will be, or will become, apparent to one with skill in the art upon examination of the following figures and detailed description. It is intended that all such additional systems, methods, features and advantages be included within this description.

BRIEF DESCRIPTION OF THE DRAWINGS

The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PRESENTLY PREFERRED EMBODIMENTS

Figure 1:
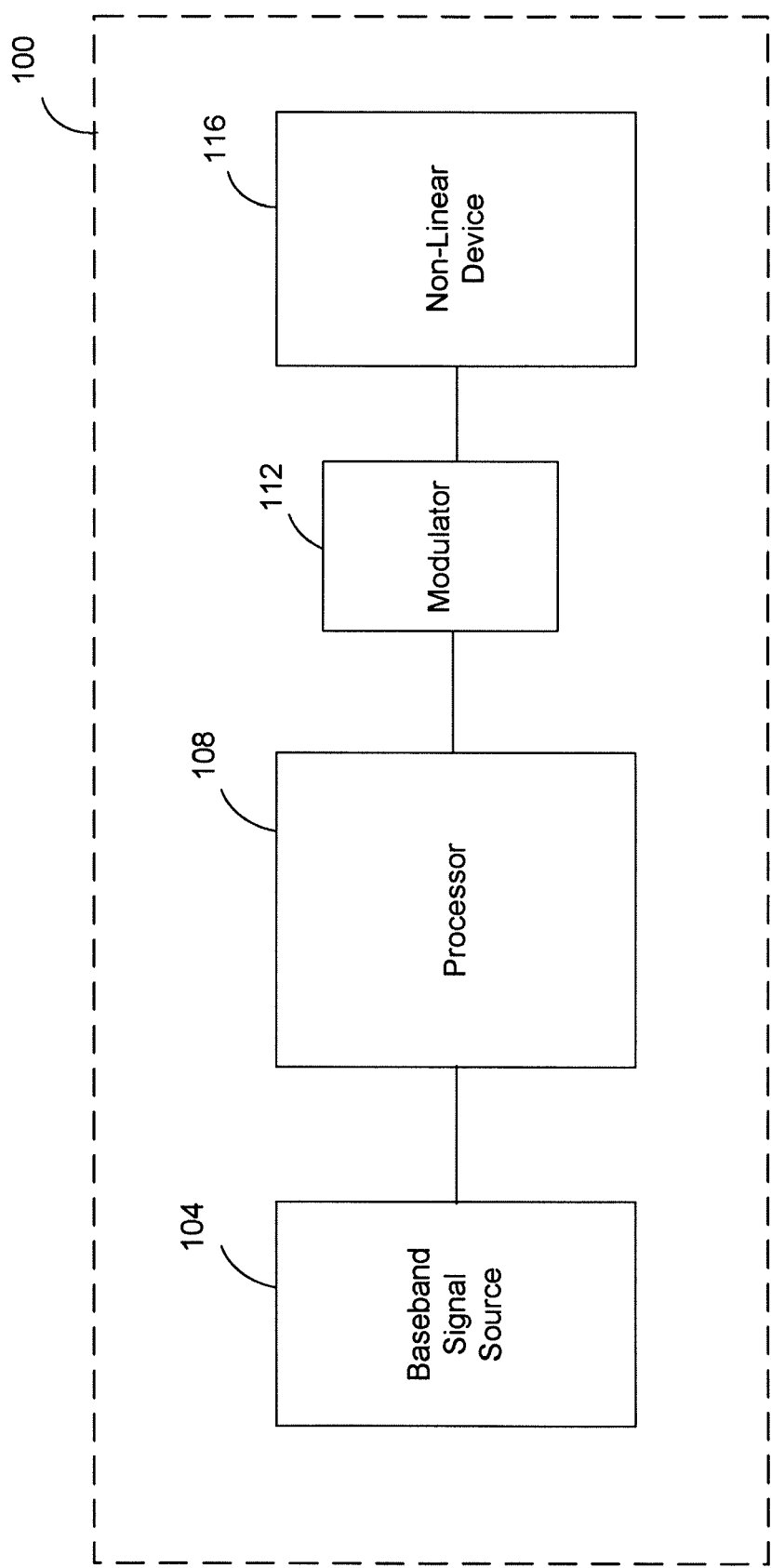
FIG. 1 is a block diagram illustrating one embodiment of a multi-carrier transmitter.

Embodiments include methods and apparatus for a transmitter, such as a multi-carrier transmitter. FIG. 1 illustrates one embodiment of a multi-carrier transmitter 100 (hereinafter referred to as "transmitter 100"). The transmitter 100 is a cellular base station transmitter, a cellular phone transmitter, an RF transmitter, and/or any known or future transmitter used for generating a multi-carrier signal. For example, the transmitter 100 may be compatible with multi-carrier CDMA transmissions, radio transmissions, and/or any other transmission systems or schemes utilizing multi-carrier signals.

The transmitter 100 includes, but is not limited to, a baseband signal source 104, a processor 108, a modulator 112, and a non-linear device 116. Fewer, more, or different components may be provided. For example, one or more memories, clocks, power sources, and/or other transmitter components may be provided. It should be noted that while the components in FIG. 1 are shown as separate from one another, one or more of these components can be combined according to particular design or implementation requirements.

The baseband signal source 104 includes one or more data sources or data for separate data communications. For example, the data sources or data may correspond to data of multiple users or separate data communications of one or more users that will be transmitted using a multi-carrier signal. The baseband signal source 104 provides baseband data or signals in an analog or digital form. The term "baseband" may refer to data or signals that have not been modulated as well as data or signals that have been processed but have not reached an RF level or stage, such as intermediate frequency ("IF") data or signals. The term "signal" may refer to any electric, electro-magnetic, analog, and/or digital medium for carrying or transferring data. A "signal" may include one or more components related to a data communication, and the use of the term "signal" may refer to the physical electricity or movement of electrons transferring data or the data itself. For example, the basedband signal source 104 may provide I and Q data or signal components for each of a variety of separate data communications. Alternatively, the baseband signal source 104 may be any device or component used for inputting baseband signals to the processor 108.

The processor 108 is in communication with the baseband signal source 104. The processor 108 may be any type of processor, including a general processor, application-specific integrated circuit ("ASIC"), digital signal processor, field programmable gate array ("FPGA"), digital circuit, analog circuit, or combinations thereof. As shown in FIG. 1, the processor 108 is a digital baseband processor. The processor 108 may be implemented as one or more processors operable to communicate with the components of the transmitter 100. The processor 108 is operable to receive a plurality of digital baseband signals. Each of the plurality of digital baseband signals corresponds to a separate data communication, respectively. The separate data communications may correspond to separate channels or different sets of data relative to communications between different entities. The processor 108 is further operable to combine the plurality of digital baseband signals to generate a composite baseband signal.

The modulator 112 is in communication with the processor 108. The modulator 112 may be one or more components used for modulating a signal. For example, the modulator 112 may include one or more mixers, VCOs, multipliers, and/or any other modulation component. Also, the modulator 112 may include a single mixer, voltage controlled oscillator, or multiplier corresponding to one composite baseband signal. The modulator 112 is operable to receive one or more composite baseband signals.

Alternatively, the modulator 112 is operable to receive one composite baseband signal, or separate modulators 112 are used for respective composite baseband signals. The modulator 112 is operable to modulate a composite baseband signal with a carrier signal to generate a multi-carrier signal. For example, the modulation scheme utilized may be polar modulation. The composite baseband signal may be converted into an analog signal prior to modulation. Alternatively, the carrier signal may be digitized and digitally modulated using the composite baseband signal. In such a case, an analog conversion occurs prior to transmission from the non-linear device 116.

The carrier signal is an RF signal or any other signal that is modulated with a baseband signal. For example, at most one or a single carrier signal is modulated with one composite baseband signal. The carrier signal has a center frequency, $\omega_c$. The center frequency, $\omega_c$, may be selected to be any frequency. For example the center frequency, $\omega_c$, is 1.0 GHz.

The multi-carrier signal includes a plurality of RF signals or sub-signals. Each of the plurality of RF signals or sub-signals are spaced at different frequencies from the center frequency, $\omega_c$. The spacing may be defined or determined by standards of the transmission system or scheme. For example, if CDMA is being utilized, the spacing may have to accommodate the set channel spacing of CDMA transmissions. Alternatively, any spacing may be used.

When the composite baseband signal modulates the carrier signal, the plurality of RF signals or sub-signals are generated at substantially the same time and are defined as a multi-carrier signal. The plurality of RF signals or sub-signals correspond to each of the plurality of baseband signals of the composite baseband signal.

The non-linear device 116 is in communication with the modulator 112. The non-linear device 116 is one or more power amplifiers ("PAs"), such as an RF PA, or any other device or component used for transmission of signals. For example, the non-linear device 116 may be a circuit or a plurality of transistors that may not necessarily be defined as a power amplifier but is used for transmitting signals. One or more multi-carrier signals are provided to one or more inputs of the non-linear device 116. For example, the non-linear device 116 may be a PA, and the non-linear device amplifies the multi-carrier signal. The amplified multi-carrier signal is then transmitted to further processing circuitry and/or an antenna.

Figure 2:
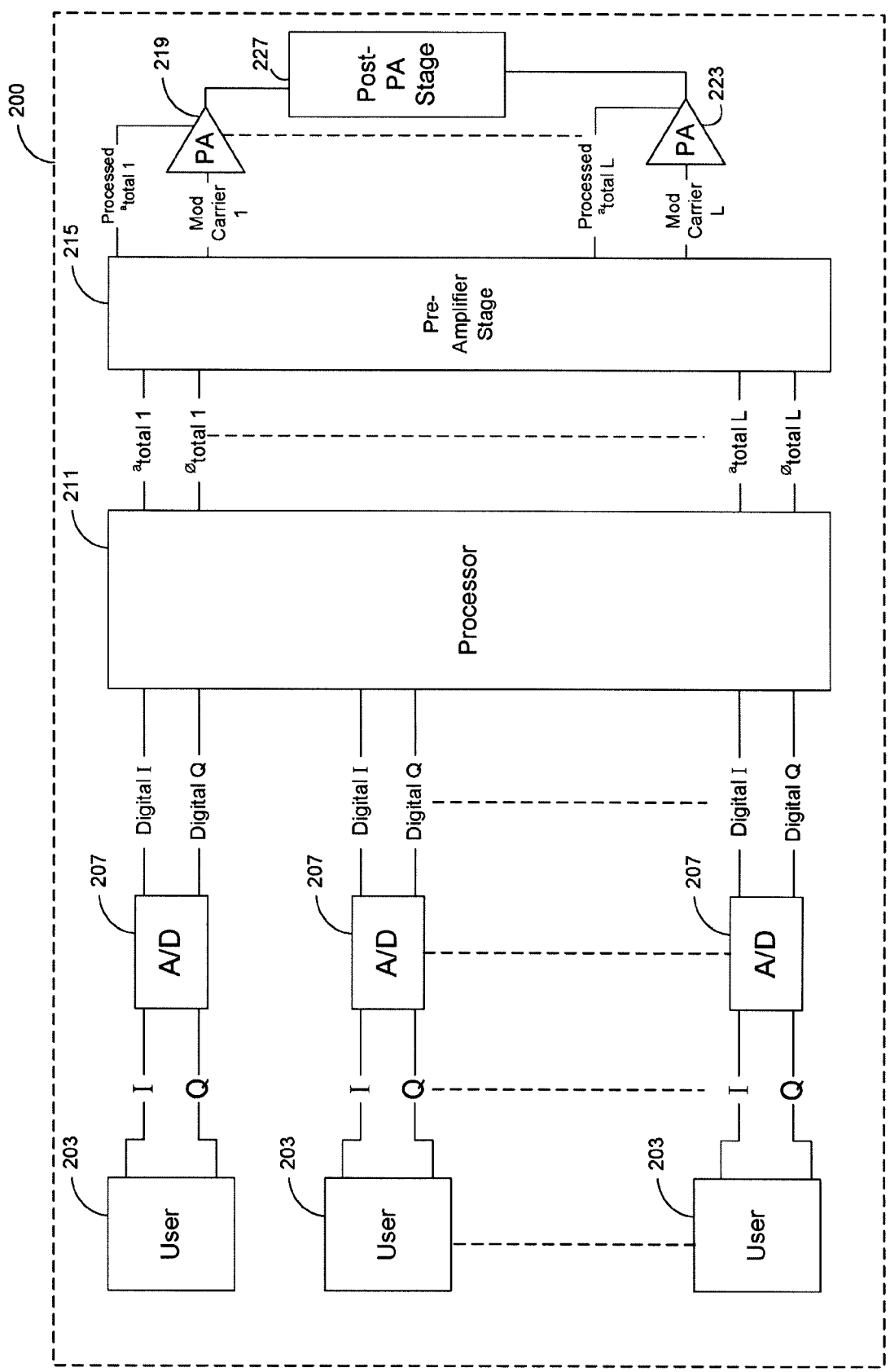
FIG. 2 illustrates a circuit of another embodiment of a multi-carrier transmitter.

FIG. 2 illustrates an embodiment of a multi-carrier transmitter 200 (hereinafter referred to as "transmitter 200"). The transmitter 200 may be similar to or different than the transmitter 100. The transmitter 200 includes one or more users 203, analog-to-digital converters ("ADCs" or "A/D") 207, a processor 211, a pre-amplifier stage 215, a PA 219, a PA 223, and post-PA stage 227. Fewer, more, or different components may be provided. It should be noted that while the components in FIG. 2 are shown as separate from one another, one or more of these components can be combined according to particular design or implementation requirements.

The users 203 are similar to or different than the baseband signal source 104. Each of the users 203 represent separate data communications that are to be transmitted. For example, the users 203 correspond to different cellular users. Alternatively, the users 203 may correspond to one user transmitting separate data communications at substantially the same time. For example, a cell phone may be used to transmit separate communications, such as at different channels or frequencies, at substantially the same time.

The users 203 provide separate baseband signals. For example, each of the respective baseband signals include an I component and a Q component. In one embodiment, the I and Q components are analog components and are provided to the ADCs 207, respectively.

The ADCs 207 are in communication with the users 203, respectively. The ADCs 207 are any known or future ADC. The ADCs 207 are operable to convert the I and Q components into digital I and Q components. Alternatively, the users 203 may provide digital baseband signals, and the use of the ADCs 207 may not be needed.

The processor 211 is in communication with the users 203 and/or the ADCs 207. For example, the processor 211 may be similar to the processor 108. The processor 211 is operable to receive the respective baseband signals, such as the respective digital I and Q components. The processor 108 is further operable to combine the plurality of baseband signals to generate a composite baseband signal.

The processor 211 utilizes trigonometry to combine the plurality of baseband signals to generate the composite baseband signal. The composite baseband signal may be defined as either:

$$= I_{total}(t)\cos(\omega_c t) - Q_{total}(t)\sin(\omega_c t) \quad (1) \text{ or } (2)$$

$$= a_{total}(t)\cos(\omega_c t + \phi_{total}(t)), \text{ respectively.}$$

Equation (1) represents the composite baseband signal in terms $I_{total}$ and $Q_{total}$, and equation (2) represents the composite baseband signal in terms of a total amplitude component, $a_{total}$, and a total phase component, $\phi_{total}$. Alternatively, other mathematical functions, algorithms, or techniques may be used to combine the plurality of baseband signals.

The pre-amplifier stage 215 is in communication with the processor 211. The pre-amplifier stage 215 is similar to or includes the modulator 112. The pre-amplifier stage 215 includes one or more VCOs, mixers, RF filters. Fewer, more, or different components may be provided. For example, the pre-amplifier stage 215 may include at most one VCO, at most one mixer, and/or at most one RF filter associated with one composite baseband signal. The RF filter may be a SAW filter or a pass-band filter used to suppress out-of-band noise that is generated on a RF modulated carrier.

The pre-amplifier stage 215 is operable to modulate a carrier signal, such as an RF carrier signal, as a function of a composite baseband signal to generate a multi-carrier signal, as described above. In one embodiment, polar modulation is utilized. In polar modulation architectures, a power amplifier or non-linear device is fed with a baseband amplitude (envelope) signal through an amplitude modulation ("AM") input and is fed a phase modulated ("PM") RF carrier through an RF input. For example, the pre-amplifier stage 215 may be operable to process the amplitude component, $a_{total}$, of equation (2) and output a processed amplitude component, processed $a_{total}$, to a first input of a power amplifier. The pre-amplifier stage is further operable to modulate the carrier signal with the phase component, $\phi_{total}$, and output a modulated phase component, mod carrier, to a second input of the power amplifier.

Alternatively, modulation schemes other than polar modulation may be utilized, such as I/Q up-conversion (IF or direct) or linear amplification using non-linear components ("LINC"). For example, equation (1), specifying the $I_{total}$ and $Q_{total}$ components, may be used for traditional I and Q up-conversion modulation. The composite baseband signal may be defined to be compatible with any modulation scheme.

In one embodiment, the pre-amplifier stage 215 is free of separate VCOs, mixers, or filters corresponding to each of the plurality of RF signals or sub-signals, respectively, of a multi-carrier signal. For example, a single or at most one carrier signal may be modulated with one composite baseband signal corresponding to a plurality of separate baseband signals.

FIG. 2 illustrates at least two separate composite baseband signals. For example, there may be N users 203, in which N is any number or integer, and the users 203 may be subdivided into L subsets, where L<N. Therefore, separate baseband signals for one subset of the users 203 are combined to form one composite baseband signal, and separate baseband signals for another subset of the users 203 are combined to form another composite baseband signal. The two composite baseband signals are individually modulated and provided to two separate PAs, respectively. For example, one PA may operate at a high power level, and the other PA may operate at a lower power level. Using multiple composite baseband signals allows for transmitting the separate data communications at different power levels. This may be beneficial because if one PA is used and some users 203 are to transmit at very low power levels compared to others, the signals of the weak or low power users 203 may be diminished or distorted when transmitting the multi-carrier signal using a highly non-linear PA. Alternatively, the transmitter 200 may use at most one PA.

In an alternate system or device, L may be equal to or greater than N. For example, six subsets may correspond to separate transmissions with respective PA's and/or other hardware. Data from five users that are not combined may correspond to five of the sixth subsets, respectively. The sixth subset may correspond to data that is combined from a sixth user and anyone of the other five users. Therefore, data from a user may be transmitted twice or more. For example, simultaneous multiple transmissions of the same data may be used for sector or other transmissions where identical data is transmitted from different directional antennas.

The PA 219 and the PA 223 are in communication with the pre-amplifier stage 215. The PA 219 and the PA 223 may be similar to or different than the non-linear device 116. The PA 219 and the PA 223 are transistor configurations, RF PAs, or any known or future PA used for transmitting signals. The PA 219 and the PA 223 are operable to amplify respective multi-carrier signals and output respective amplified multi-carrier signals.

The post-PA stage 227 is in communication with the PA 219 and the PA 223, respectively. The post-PA stage 227 includes, but is not limited to, RF processing components, such as filters, and/or one or more antennas, such as RF antennas. One antenna may transmit one or more multi-carrier signals. Alternatively, separate antennas may be used to transmit different multi-carrier signals, respectively.

Figure 3:
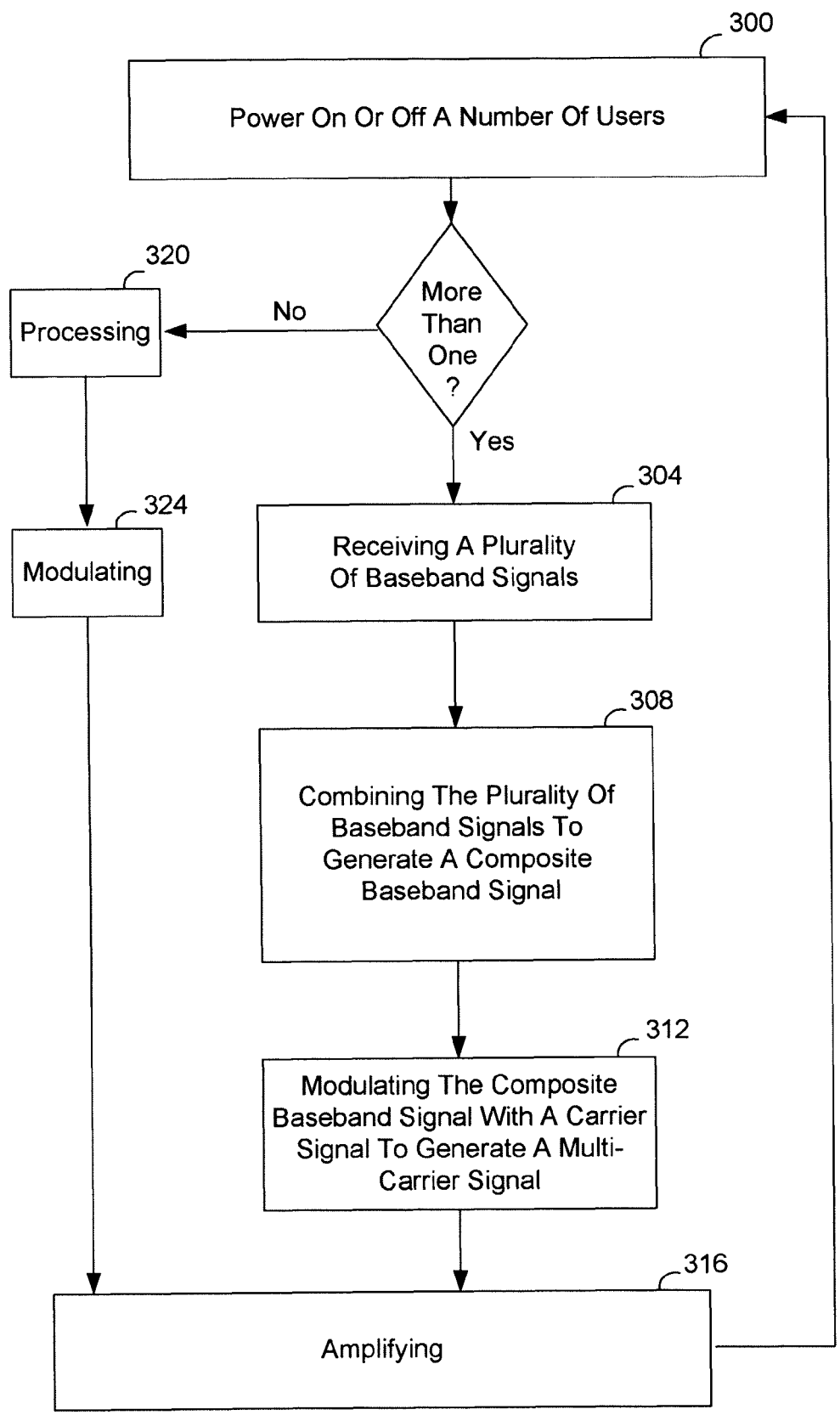
FIG. 3 is a flowchart illustrating one embodiment of a method for generating a multi-carrier signal.

FIG. 3 illustrates one embodiment of a method for generating a multi-carrier signal. Fewer, more, or different steps may be provided. The steps may be arranged in different orders. In step 300, any number of users (the "users" may refer to one user transmitting separate data communications), such as the users 203, or separate baseband signal sources, such as the baseband signal source 104, are powered on or off. For example, a transmitter, such as the transmitter 100 or 200, is activated to transmit a multi-carrier signal. Power supplies or other components provide current or power to the baseband signal sources. The baseband signal sources that are activated provide baseband signals to a processor, such as the processor 211 or 108, respectively, and the inactive baseband signal sources do not provide any baseband signals.

If two or more separate baseband signals are provided by one or more sources or components, then the plurality of separate baseband signals will be processed into a composite baseband signal. For example, in step 304, a plurality of baseband signals may be received at a processor, such as the processor 211 or 108. Each of the plurality of baseband signals correspond to a separate data communication.

In step 308, the plurality of baseband signals are combined to generate a composite baseband signal, such as the signal represented by equations (1) or (2). For example, the combination of the plurality of signals may include a sine or cosine function, such as an aggregation, multiplication, and/or summation of components based on one or more sine or cosine functions. Any other mathematical or digital technique or functions may be used to combine the plurality of separate baseband signals.

Figure 4:
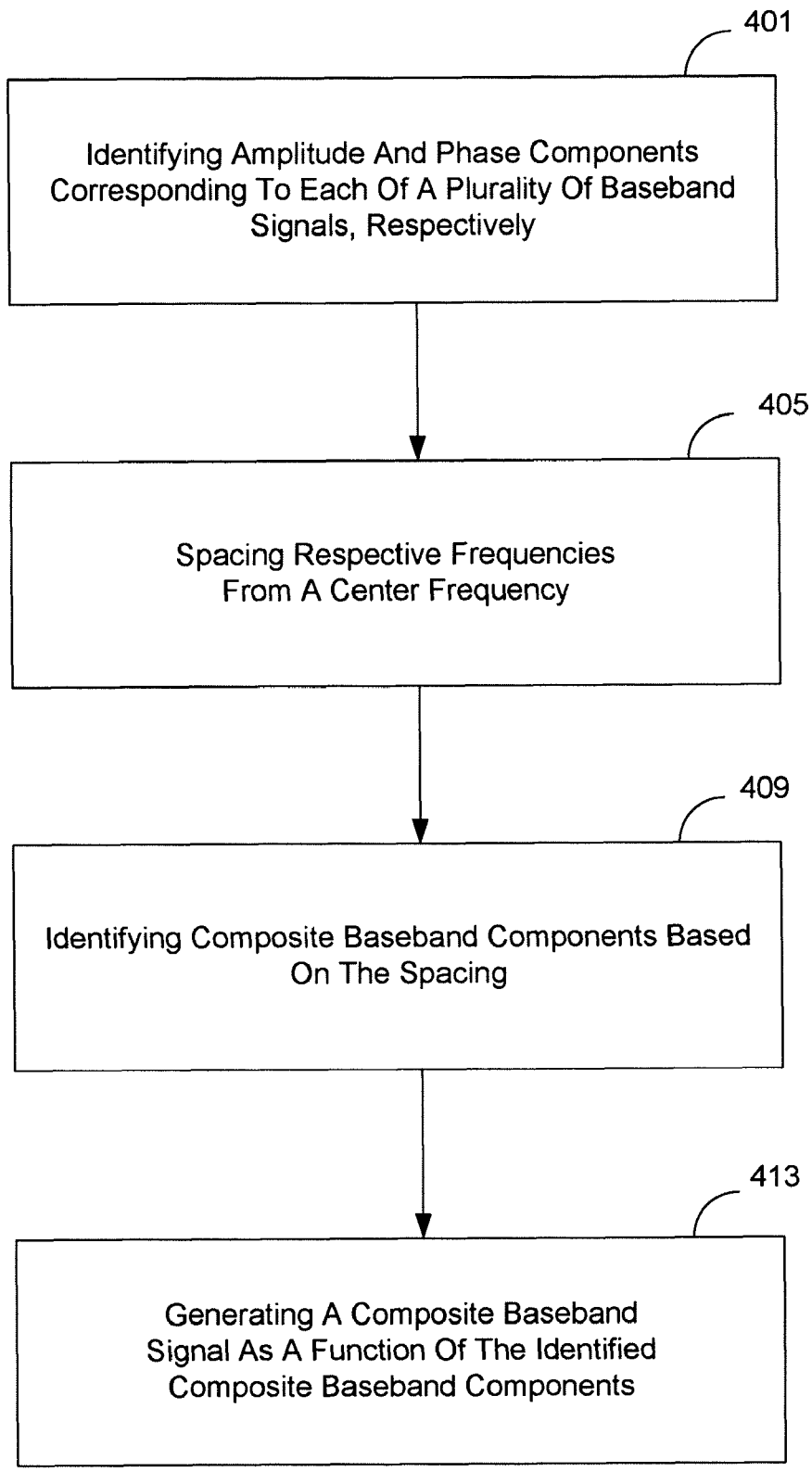
FIG. 4 is a flowchart illustrating one embodiment of a method for combining a plurality of baseband signals.

FIG. 4 is an embodiment of a method for combining a plurality of baseband signals, such as in step 308. For example, in step 401, amplitude and phase components corresponding to each of the separate baseband signals may be identified:

$$s(t) = \sum_{i=1}^{N} a_i(t)\cos(\omega_i t + \phi_i(t)) \quad (3)$$

The identification of the components may be represented by a summation. Alternatively, multiplication and/or another mathematical technique for combining or aggregating components may be utilized. Equation (3) represents amplitude, $a_i$, phase, $\phi_i$, and frequency, $\omega_i$, components corresponding to each of the plurality of separate baseband signals, respectively, prior to modulation, where i=1, ..., N, the number of separate baseband signals. For example, equation (3) may be a mathematical representation of a signal that can modulate a carrier signal having a selected center frequency, $\omega_c$, to generate a multi-carrier signal.

In step 405, the respective frequencies, $\omega_i$, are spaced or shifted away ($\Delta\omega_i$) from a center frequency, $\omega_c$, to set each of the plurality of separate baseband signals at different frequencies:

$$= \sum_{i=1}^{N} a_i(t)\cos(\omega_c t + \Delta\omega_i t + \phi_i(t)) \quad (4)$$

In step 409, baseband components, such as composite baseband components, are identified based on the frequency spacing or shifting. For example, equation (4) is manipulated or further defined using trigonometry principles to identify multiple sine and cosine functions:

$$= \sum_{i=1}^{N} a_i(t) \cdot [\cos(\omega_c t)\cos(\Delta\omega_i t + \phi_i(t)) - \sin(\omega_c t)\sin(\Delta\omega_i t + \phi_i(t))] \quad (5)$$

$$= \sum_{i=1}^{N} a_i(t) \cdot [\cos(\omega_c t)[\cos(\Delta\omega_i t)\cos(\phi_i(t)) - \sin(\Delta\omega_i t)\sin\phi_i(t))] - \quad (6)$$

$$\sin(\omega_c t)[\sin(\Delta\omega_i t)\cos(\phi_i(t)) + \cos(\Delta\omega_i t)\sin(\phi_i(t))]]$$

Assuming that:

$$I_i(t) = a_i(t)\cos(\phi_i(t))$$

$$Q_i(t) = a_i(t)\sin(\phi_i(t)) \quad (7) \text{ and } (8), \text{ respectively,}$$

one can determine the $I_{total}$ and $Q_{total}$ components:

$$= \sum_{i=1}^{N} \underbrace{a_i(t) \cdot [\cos(\Delta\omega_i t)\cos(\phi_i(t)) - \sin(\Delta\omega_i t)\sin(\phi_i(t))]}_{I_{total}(t)} \cdot \cos(\omega_c t) - \quad (9)$$

$$\sum_{i=1}^{N} \underbrace{a_i(t) \cdot [\sin(\Delta\omega_i t)\cos(\phi_i(t)) + \cos(\Delta\omega_i t)\sin(\phi_i(t))]}_{Q_{total}(t)} \cdot \sin(\omega_c t)$$

In step 413, based on the identification of the $I_{total}$ and $Q_{total}$ components, the composite baseband signal, equation (1) or (2), is determined or generated:

$$= I_{total}(t)\cos(\omega_c t) - Q_{total}(t)\sin(\omega_c t) \quad (1) \text{ or } (2)$$
$$= a_{total}(t)\cos(\omega_c t + \phi_{total}(t)), \text{ respectively}$$
where $$a_{total}(t) = \sqrt{I_{total}^2(t) + Q_{total}^2(t)} \quad (10)$$

and $$\phi_{total}(t) = \tan^{-1}\left\{\frac{I_{total}(t)}{Q_{total}(t)}\right\}. \quad (11)$$

Referring back to FIG. 3, in step 312, the composite baseband signal is used to modulate a carrier signal, such as a single carrier signal with the center frequency, $\omega_c$, to generate a multi-carrier signal. For example, the composite baseband signal may be polar modulated. A modulator, such as the modulator 112, and/or a pre-amplifier stage, such as the pre-amplifier stage 215, may be used to modulate the composite baseband signal. The composite baseband signal may also be converted into an analog signal prior to modulation.

In step 316, the multi-carrier signal is amplified. For example, a PA, such as the PA 219 or PA 223, amplifies the multi-carrier signal to generate an amplified multi-carrier signal. The amplified multi-carrier signal is further processed by RF filters and/or is sent to one or more antennas for transmission.

If at most one baseband signal related to one data communication is provided or activated at step 300, then the baseband signal may be processed, in step 320, to be transmitted without using a multi-carrier signal generation process. For example, the baseband signal may be processed using common techniques used in single carrier transmissions.

In step 324, the processed baseband signal modulates a carrier frequency to generate an RF signal. In step 316, the RF signal is amplified and transmitted as mentioned above. Alternatively, even if at most one baseband signal may be provided, the same multi-carrier signal process, including steps 304, 308, and 312, may be utilized for minimizing logic or any other reasons.

The logic, software or instructions for implementing the processes, methods and/or techniques discussed above are provided on computer-readable storage media or memories or other tangible media, such as a cache, buffer, RAM, removable media, hard drive, other computer readable storage media, or any other tangible media. The tangible media include various types of volatile and nonvolatile storage media. The functions, acts or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU") or system.

Several other approaches may be implemented. For example, the features of the various multi-carrier transmitters discussed above may be mixed and matched to accomplish similar results. Also, more than one multi-carrier transmitter may be utilized.

It is intended that the foregoing detailed description be regarded as illustrative rather than limiting, and that it be understood that the following claims, including all equivalents, are intended to define the scope of this invention.

The invention claimed is:

1. A multi-carrier transmitter, comprising:
   a processor operable to receive a plurality of digital baseband signals, each of the plurality of digital baseband signals corresponding to a separate data communication from a different user;
   a modulator in communication with the processor; and
   a non-linear device in communication with the modulator;
   wherein the processor is further operable to combine the plurality of digital baseband signals to generate a digital composite baseband signal;

wherein the modulator is operable to modulate a digital carrier signal with the digital composite baseband signal to generate a digital multi-carrier signal, the digital carrier signal having a center frequency;

wherein the digital multi-carrier signal comprises a plurality of signals corresponding to the plurality of digital baseband signals, respectively, at least one of the plurality of signals corresponding to at least two of the plurality of digital baseband signals, each of the plurality of signals spaced at different frequencies from the center frequency;

wherein the digital multi-carrier signal is provided to an input of the non-linear device.

2. The multi-carrier transmitter of claim 1, wherein the non-linear device comprises a power amplifier.

3. The multi-carrier transmitter of claim 1, wherein each of the plurality of digital baseband signals comprises I and Q components.

4. The multi-carrier transmitter of claim 1, wherein the digital composite baseband signal comprises an amplitude component and a phase component.

5. The multi-carrier transmitter of claim 4, wherein modulation of the carrier signal comprises polar modulation.

6. The multi-carrier transmitter of claim 1, wherein combination of the plurality of baseband signals comprises a cosine or sine function.

7. A multi-carrier transmitter, comprising:
a processor operable to receive a plurality of digital baseband signals, each of the plurality of digital baseband signals corresponding to a respective radio frequency ("RF") sub-signal of a plurality of RF sub-signals and representing a separate data communication from a different user;
a pre-amplifier stage in communication with the processor; and
a power amplifier in communication with the pre-amplifier stage;
wherein the processor is further operable to combine the plurality of digital baseband signals to generate a digital composite baseband signal;
wherein the pre-amplifier stage is operable to modulate a RF carrier signal as a function of the digital composite baseband signal to generate a digital multicarrier signal, the digital multi-carrier signal including the plurality of RF sub-signals, the RF carrier signal having a center frequency;
wherein the digital multi-carrier signal comprises a plurality of signals corresponding to the plurality of digital baseband signals, respectively, at least one of the plurality of signals corresponding to at least two of the plurality of digital baseband signals, each of the plurality of signals spaced at different frequencies from the center frequency;
wherein the power amplifier is operable to amplify the digital multi-carrier signal and output an amplified digital multi-carrier signal.

8. The multi-carrier transmitter of claim 7, wherein the pre-amplifier stage is free of separate voltage controlled oscillators, mixers, or filters corresponding to each of the plurality of RF sub-signals, respectively.

9. The multi-carrier transmitter of claim 7, wherein the RF carrier signal comprises at most one RF carrier signal.

10. The multi-carrier transmitter of claim 7, wherein each of the plurality of digital baseband signals comprises I and Q components.

11. The multi-carrier transmitter of claim 10, further comprising:
an analog-to-digital converter in communication with the processor, the analog-to-digital converter operable to convert the I and Q components into digital I and Q components.

12. The multi-carrier transmitter of claim 7, wherein the pre-amplifier stage comprises at most one voltage controlled oscillator, at most one mixer, or at most one RF filter associated with the composite baseband signal.

13. The multi-carrier transmitter of claim 7, wherein the digital composite baseband signal comprises an amplitude component and a phase component.

14. The multi-carrier transmitter of claim 13, wherein the modulation of the RF carrier signal comprises polar modulation, the polar modulation including modulation of the RF carrier signal with the phase component.

15. The multi-carrier transmitter of claim 14, wherein the pre-amplifier stage is further operable to process the amplitude component and output a processed amplitude component to a first input of the power amplifier, and wherein the pre-amplifier stage is further operable to output a modulated phase component to a second input of the power amplifier.

16. A method for generating a multi-carrier signal, the method comprising:
receiving a plurality of baseband signals, each of the plurality of baseband signals corresponding to a separate data communication from a different user, and converting the plurality of baseband signals to a plurality of digital baseband signals;
combining the plurality of digital baseband signals to generate a digital composite baseband signal; and
modulating a carrier signal with the digital composite baseband signal to generate a multi-carrier signal, the carrier signal having a center frequency;
wherein the multi-carrier signal comprises a plurality of sub-signals corresponding to the plurality of digital baseband signals, respectively, at least one of the plurality of sub-signals corresponding to at least two of the plurality of digital baseband signals, each of the plurality of sub-signals spaced at different frequencies from the center frequency.

17. The method of claim 16, wherein combining the plurality of baseband signals comprises:
identifying amplitude and phase components corresponding to each of the plurality of baseband signals, respectively, each of the respective amplitude and phase components associated with a frequency;
spacing the respective frequencies from the center frequency;
identifying composite baseband components based on the spacing; and
generating the digital composite baseband signal as a function of the identified composite baseband components.

* * * * *